US012601543B2

(12) United States Patent
Sangiovanni et al.

(10) Patent No.: US 12,601,543 B2
(45) Date of Patent: Apr. 14, 2026

(54) DRYER FOR CERAMIC TILES OR SLABS

(71) Applicant: SYSTEM CERAMICS S.P.A., Fiorano Modenese (IT)

(72) Inventors: Carmine Sangiovanni, Formigine (IT); Eustachio Tarasco, Bologna (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 834 days.

(21) Appl. No.: 17/795,032

(22) PCT Filed: Feb. 18, 2021

(86) PCT No.: PCT/IB2021/051358
§ 371 (c)(1),
(2) Date: Jul. 25, 2022

(87) PCT Pub. No.: WO2021/165860
PCT Pub. Date: Aug. 26, 2021

(65) Prior Publication Data

US 2023/0055242 A1 Feb. 23, 2023

(30) Foreign Application Priority Data

Feb. 18, 2020 (IT) ........................ 102020000003263
Oct. 23, 2020 (IT) ........................ 102020000025156

(51) Int. Cl.
*F26B 15/10* (2006.01)
*F26B 3/04* (2006.01)
*F26B 21/12* (2006.01)

(52) U.S. Cl.
CPC ................ *F26B 15/10* (2013.01); *F26B 3/04* (2013.01); *F26B 21/12* (2013.01); *F26B 2210/02* (2013.01)

(58) Field of Classification Search
None
See application file for complete search history.

(56) References Cited

U.S. PATENT DOCUMENTS 4,059,399 A * 11/1977 Cellier .................... F26B 15/12
432/121
4,154,576 A 5/1979 Bossetti
(Continued)

FOREIGN PATENT DOCUMENTS

CN 101526305 A 9/2009
CN 203243888 U 10/2013
(Continued)

OTHER PUBLICATIONS

Office Action from Chinese Patent Application No. 202180010620.1, Dated: May 22, 2024, 10 Pages.

*Primary Examiner* — Jason Lau
(74) *Attorney, Agent, or Firm* — Chrisman Gallo Tochtrop LLC

(57) ABSTRACT

A dryer for ceramic products, such as for example slabs or tiles, comprising: a drying chamber (1): at least one drying channel (10), comprising a shelf (11) for one or more ceramic products: at least two manifolds (20), positioned respectively above and below the shelf (11), each of which is connected to a source of conditioned air. The manifold (20) located above the shelf (11) has an extended shape and is provided with a flat lower surface (21*a*), which in the plan view covers at least a portion of the shelf (11) and is provided with a plurality of lower openings (22*a*) for emitting the conditioned air into the drying channel (10). The manifold (20) located below the shelf (11) has an extended shape and is provided with a flat upper surface (21 *b*), which in the plan view covers at least a portion of the shelf (11) and is provided with a plurality of upper openings (22*b*) for emitting the conditioned air into the drying channel (10).

15 Claims, 8 Drawing Sheets

(56) References Cited

U.S. PATENT DOCUMENTS

| | | | |
|---|---|---|---|
| 5,970,626 | A | 10/1999 | Schmidt et al. |
| 10,274,253 | B2 | 4/2019 | Mongrolle et al. |
| 10,941,983 | B2 | 3/2021 | Mongrolle et al. |
| 2008/0086905 | A1 | 4/2008 | Yanes |
| 2015/0308739 | A1 | 10/2015 | Mongrolle et al. |
| 2019/0226759 | A1 | 7/2019 | Mongrolle et al. |

FOREIGN PATENT DOCUMENTS

| | | | | |
|---|---|---|---|---|
| CN | 206413685 | U | | 8/2017 |
| CN | 207779046 | U | | 8/2018 |
| CN | 209737163 | U | | 12/2019 |
| CN | 111336775 | A | | 6/2020 |
| CN | 210922012 | U | | 7/2020 |
| CN | 211147229 | U | | 7/2020 |
| CN | 211503589 | U | | 9/2020 |
| CN | 218915798 | U | | 4/2023 |
| DE | 2608228 | A1 | | 9/1976 |
| DE | 3708642 | A1 | * | 10/1988 |
| EP | 0499768 | A1 | | 8/1992 |
| EP | 2098811 | A2 | | 9/2009 |
| EP | 2741037 | A1 | | 6/2014 |
| ES | 106434 | U | | 9/2005 |
| FI | 71413 | B | * | 9/1986 |
| JP | H08170877 | A | | 7/1996 |

* cited by examiner

DRYER FOR CERAMIC TILES OR SLABS

The present invention relates to a dryer. In particular, the invention relates to a dryer for ceramic tiles or slabs.

In the sector of the production of ceramic tiles and slabs, dryers are currently available that are used to reduce the moisture in products before firing. In summary, the dryer is provided to regulate the moisture in products so that it is not excessive for the firing process. In fact, excessive moisture implies a high risk of the products breaking during firing.

The dryers currently available comprise a series of roller planes, mutually superimposed, on which the products to be dried are positioned. Each roller plane defines a channel of the dryer and one dryer can have one or more superimposed channels. The roller planes are preferably motorised, to lead the products coming from an external transport plane into the channel of the dryer.

A flow of hot air is conveyed into each channel of the dryer, which hits the products, reducing the moisture therein. In current dryers, the hot air is conveyed into each channel through a plurality of tubular terminals, arranged above and below the roller plane of the channel. The terminals are arranged parallel to the rollers that form the roller planes, i.e. they are arranged inside the channel transversally to the advancement direction of the products. For the delivery of the hot air, the terminals are provided with a series of openings distributed on the surface of the terminals themselves.

In current dryers, it is not possible to regulate the flow of hot air within the individual terminals. This substantially implies the impossibility to obtain uniform regulation of the moisture for all the products present inside the dryer. In other words, as the flow of air passing into the individual terminals cannot be modified, zones are defined with a greater air flow, in which the products are dried more, and zones with a lower air flow, in which the products are dried less. In fact, inevitably, inside the dryer there are zones at a different temperature, given that the hot air changes temperature proceeding along the distribution terminals. It can happen that the products that are located in the colder zones of the dryer are not sufficiently dried, and therefore undergo damage during the firing process.

Examples of heating machines, which modify in part the distribution of hot air within the heating chamber are known from documents EP2741037, U.S. Pat. Nos. 4,059,399, 5,970,626.

The object of the present invention is to provide a dryer which enables the drawbacks of the currently available dryers to be obviated.

An advantage of the dryer according to the present invention is that it enables hot air to be distributed uniformly and homogeneously.

Another advantage of the dryer according to the present invention is that it enables the flow of hot air to be regulated differently in two or more internal zones of the drying channel.

A further advantage of the dryer according to the present invention is that it enables effective and quick cleaning.

A further advantage of the dryer according to the present invention is that the current dryers can be replaced, without requiring any substantial modifications to the surrounding plants and machinery.

Additional features and advantages of the present invention will become more apparent from the following detailed description of one embodiment of the invention, illustrated by way of non-limiting example in the appended figures in which.

Figure 1:
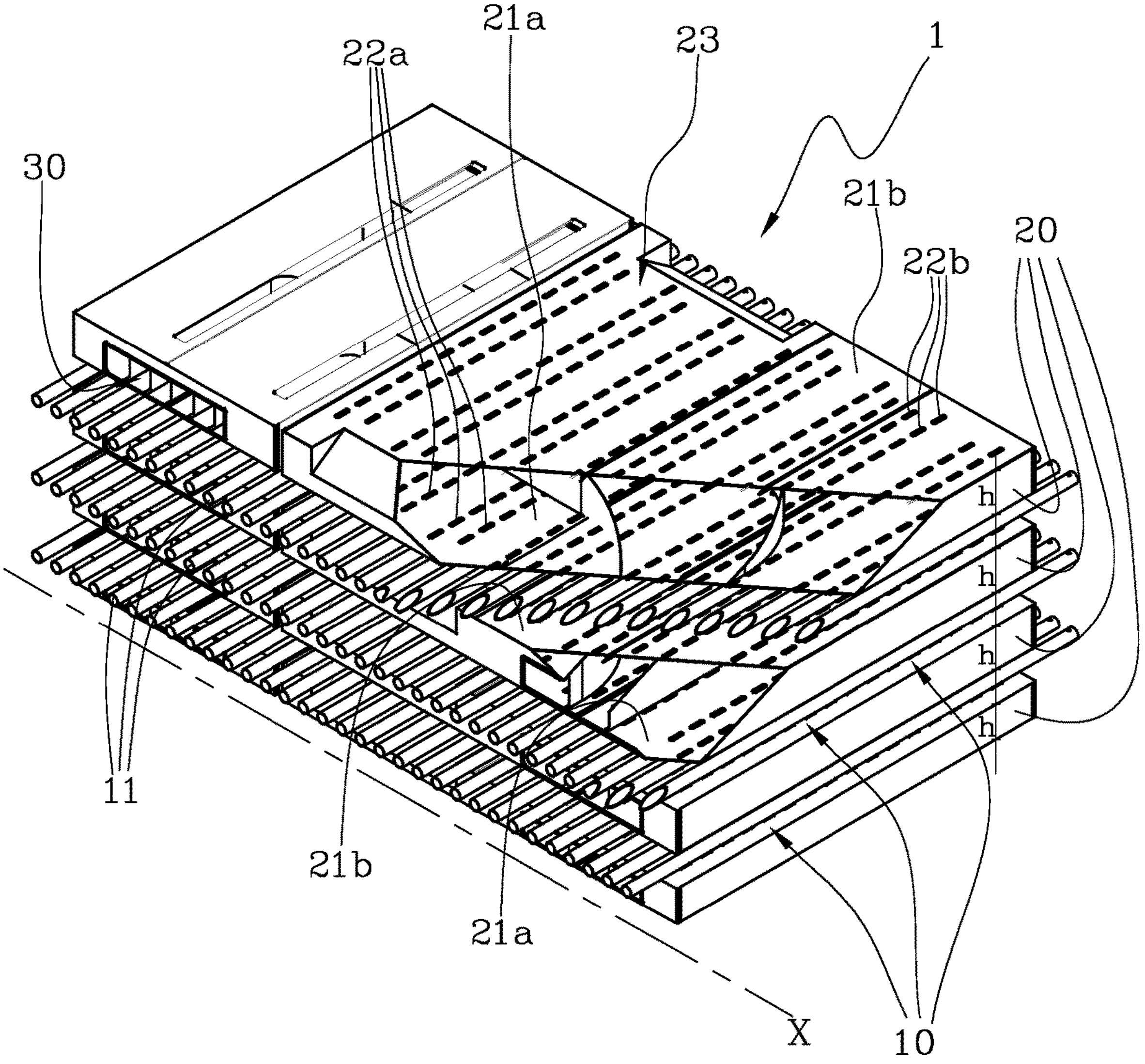
FIG. 1 is an isometric view of a portion of the dryer according to the present invention.
Figure 2:
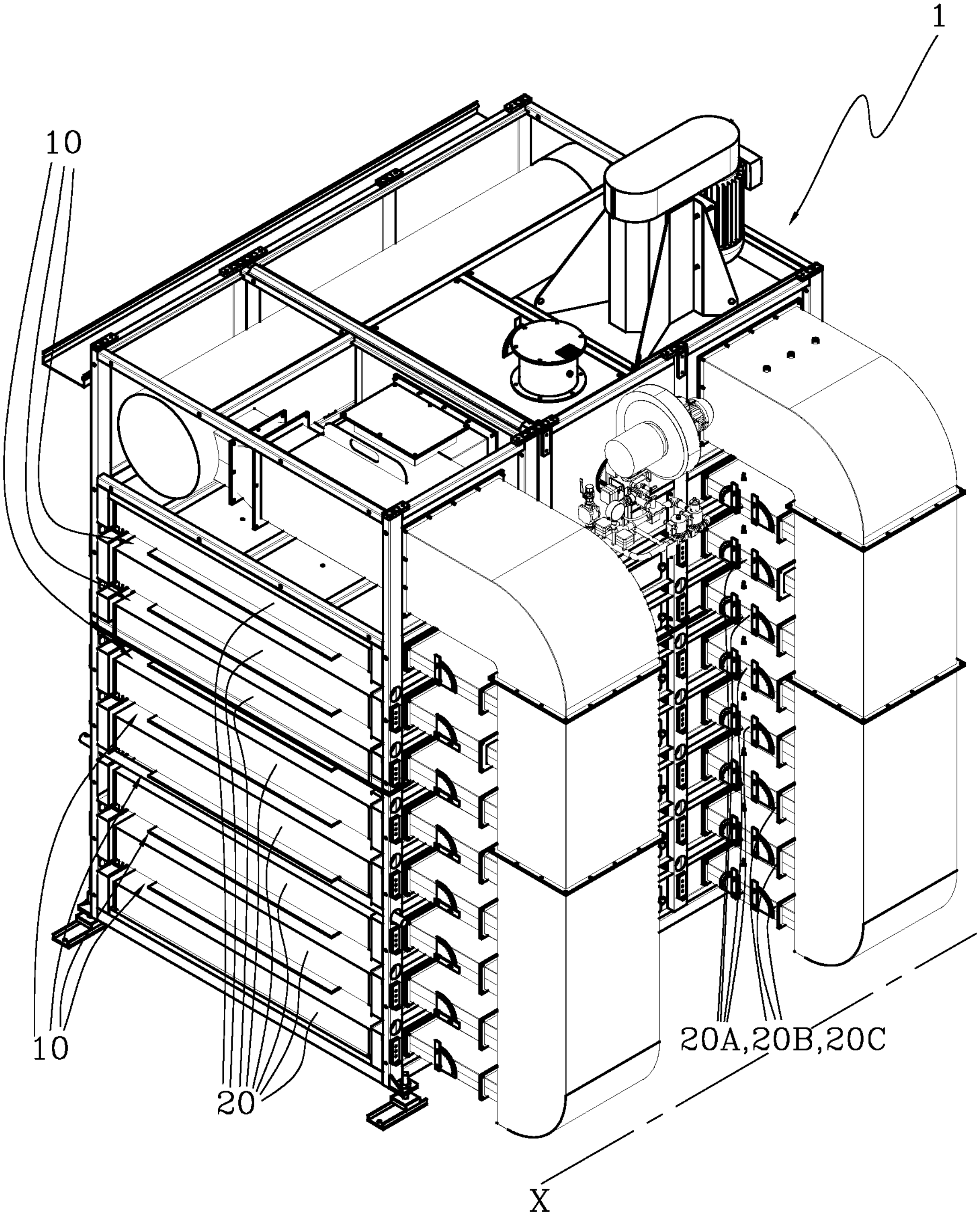
FIG. 2 is an isometric view of the dryer according to the present invention.

The dryer according to the present invention comprises a drying chamber (1), into which the products to be dried are conveyed. The drying chamber (1) is contained by a casing, not shown for the purpose of greater visibility of the internal zone of the dryer. The drying chamber (1) comprises at least one drying channel (10), along which the products to be dried transit. The drying channel comprises a shelf (11) provided to support the products. In the embodiment shown, the shelf (11) is a roller plane, which enables the advancement of the products along a main direction (X), for the inlet and outlet of the products from the drying channel (10).

The drying channel (10) is delimited by two manifolds (20), positioned above and below the shelf (11). Each manifold (20) is connected to a source of conditioned air. Each manifold (20) substantially performs the function of conducting and spreading the conditioned air into the drying channel (10). The conditioned air can be produced by means of plants and devices known in the sector. For example, the air can be conditioned by means of heating through one or more burners.

In the embodiment represented, which is preferred but not exclusive, the dryer comprises a plurality of drying channels (10) mutually parallel and superimposed. A manifold (20) is arranged above and below each drying channel (10), i.e. two drying channels (10) are separated by a manifold (20). The manifold (20) interposed between two superimposed drying channels (10) is structured to spread the conditioned air into both drying channels (10), i.e. upwards and downwards. The following description shall mainly refer to one drying channel (10), but it can obviously refer to each of the drying channels (10).

Advantageously, a manifold (20) according to the present invention has an extended conformation and is provided with a lower surface (21*a*) and an upper surface (21*b*). Preferably, the two surfaces (21*a*,21*b*) are flat.

Considering a drying channel (10), the lower surface (21*a*) occupies on the plan view at least one portion of the underlying shelf (11), whereas the upper surface (21*b*) occupies on the plan view at least one portion of the overlying shelf (11).

The lower surface (21*a*) of the upper manifold (20) is provided with a plurality of openings (22*a*) for emitting the conditioned air into the underlying drying channel (10). The upper surface (21*b*) of the lower manifold (20) is provided with a plurality of upper openings (22*b*) for emitting the conditioned air into the overlying drying channel (10).

Unlike the dryers currently available, which have a certain number of tubular manifolds placed above and below the shelf (11), the dryer according to the present invention only has two manifolds (20) per shelf (11), one positioned above and one positioned below the shelf (11) itself. Each manifold (20) substantially contains a single volume which is supplied with the conditioned air to be introduced into the drying channel (10). The conditioned air is distributed uniformly and homogeneously into the manifold (20), so that the flows that exit from the openings (22*a*,22*b*) are likewise uniform and homogeneous, both in terms of flow rate and in terms of temperature. Preferably, the openings (22*a*,22*b*) are substantially distributed on all the lower and upper surfaces (21*a*, 21*b*), to have a completely uniform and homogeneous spread of the air.

Preferably, the lower surface (21*a*) is parallel to the underlying shelf (11), so that the various air flows that exit from the lower openings (22*a*) substantially travel the same distance before meeting the shelf (11), thus keeping the characteristics homogeneous. In the same way, the upper surface (21*b*) is parallel to the overlying shelf (11), so that the various air flows that exit from the lower openings (22*a*) substantially travel the same distance before meeting the shelf (11), thus keeping the characteristics homogeneous.

Preferably, the lower surface (21*a*) has an extension that is substantially identical to the extension of the underlying shelf (11). In this way, the whole shelf (11) is hit by flows of air, coming from the manifold (20) through the lower openings (22*a*), which have homogeneous and uniform characteristics. Preferably, the upper surface (21*b*) has an extension that is substantially identical to the extension of the overlying shelf (11). In this way, the whole shelf (11) is hit by flows of air, coming from the manifold (20) through the upper openings (22*b*), which have homogeneous and uniform characteristics.

Thanks to the characteristics of the manifolds (20), the products that are arranged on the shelf (11) interposed between two manifolds (20) are subject to a uniform action in every zone of the shelf (11). The products leaving the dryer therefore have constant homogeneous and uniform characteristics, with particular reference to the degree of moisture.

Preferably, the conditioned air is supplied to each manifold (20) in countercurrent with respect to the advancement direction of the products on the shelf (11).

Advantageously, the dryer comprises a collection drawer (60) located above the manifold (20) placed below the shelf (11). In particular, the collection drawer (60) is arranged above the upper surface (21*b*) of the manifold (20) placed below the shelf (11). In the illustrated embodiment, comprising various shelves (11), a collection drawer (60) can be located above each manifold (20), i.e. it can be interposed between each manifold (20) and the shelf (11) overlying the manifold (20). The following description mainly refers to a manifold (20) and to the overlying collection drawer (60), but it can obviously refer to each manifold (20) present in the dryer.

The collection drawer (60) is provided with through openings (61), configured to enable the flow of air coming from the underlying manifold (20), in particular from the upper openings (22*b*) of the manifold (20). In other words, the collection drawer (60) is interposed between one shelf (11) and the underlying manifold (20). In this way, any particles or residues that are detached from the products located on the shelf (11) fall and are deposited on the collection drawer (60), without accumulating on the underlying manifold (20).

Advantageously, the collection drawer (60) can be extracted from the dryer. For that purpose the collection drawer (60) is housed inside the dryer, in the position indicated above, through guides and/or slidable and/or removable attachment systems not illustrated, as they are known to a person skilled in the art. In this way, the collection drawer (60) can be quickly extracted and cleaned, to be subsequently reinserted into the dryer. Preferably, but not necessarily, the dryer can be provided with openable and/or removable doors and/or panels, to facilitate the extraction of the collection drawer (60).

In the embodiment shown, which is preferred but not exclusive, the collection drawer (60) has a mainly flat shape. Preferably, the collection drawer (60) mainly lies on a main plane parallel to the shelf (11). The through openings (61) are substantially aligned with the upper openings (22*b*) of the manifold (20). In the illustrated embodiment, both the through openings (61) of the collection drawer (60), and the upper openings (22*b*) of the manifold (20) are distributed along mutually parallel rows perpendicular to the main direction (X). Preferably, the through openings (61) of the collection drawer (60), and the upper openings (22*b*) of the manifold (20) are aligned on vertical planes perpendicular to the main direction (X).

In the illustrated embodiment, the collection drawer (20) comprises a plurality of projecting ribs (62), which extend away from the manifold (20), i.e. that extend towards the overlying shelf (11). Preferably, the ribs (62) are hollow and open towards the underlying manifold (20). In the illustrated embodiment, the ribs (62) have a V-shaped conformation, with the apex turned towards the overlying shelf (11), and are open towards the underlying manifold (20).

In the illustrated embodiment, which is preferred but not exclusive, the shelf (11) is substantially horizontal and the ribs (62) extend vertically upwards, i.e. towards the overlying shelf (11). Preferably, the ribs (62) are mutually parallel and are oriented perpendicularly to the main direction (X). Preferably, the through openings (61) are arranged in apex zones of the ribs (62). In particular, the through openings (61) are distributed along the apex of the ribs (62). In this way, the ribs (62) convey the air coming from the manifold (20) underlying its own apexes and, therefore, towards the through openings (61). This promotes the spread of the air towards the underlying shelf (11). Furthermore, the ribs (62) divert the particles or residues that fall from the overlying shelf (11) away from the through openings (61) that are arranged at the apex of the ribs themselves, preventing such particles or residues from being able to obstruct both the through openings (61), and the upper openings (22*b*) of the underlying manifold (20). The particles or residues are collected in the zones of the drawer (60) interposed between the ribs (62).

In the illustrated embodiment, wherein the shelf (11) is defined by a plurality of mutually coplanar rollers, the ribs (62), bearing the through openings (61), are distributed with a pitch substantially equal to the pitch separating the rollers of the shelf (11). This promotes a uniform distribution of the air with respect to the shelf (11) itself.

In the illustrated embodiment, each manifold (20) has a flattened box shape, defined below by the lower surface (21*a*) and above by the upper surface (21*b*). Such shape is particularly useful to enable the positioning of a shelf (11) between two mutually superimposed manifolds (20). In other words, each drying channel (10) is delimited, above and below, by two manifolds (20), i.e. each shelf (11) is interposed between two manifolds (20), a lower one and an upper one. In the illustrated embodiment, which is preferred but not exclusive, the lower surface (21*a*) and the upper surface (21*b*) are identical to one another in terms of shape and size.

Preferably, each manifold (20) comprises a casing (23) having a prismatic shape, which has a lower height (h) than two orthogonal dimensions of the lower surface (21*a*). If, for example, the lower surface has a length measured parallel to the main advancement direction (X) of the products, and a width measured perpendicular to the width, the height (h) is less than the width and the length of the lower surface (21*a*). For example, the height (h) is about 1/10 of the length of the lower surface (21*a*).

In an advantageous possible embodiment, each manifold (20) comprises two or more volumes (2A,2B,2C), separated by one or more partitions (24,25) which isolate the volumes (2A,2B,2C) from one another. Inside each volume, the conditioned air is distributed uniformly, assuming homogeneous characteristics and being distributed in equally homogeneous flows through the openings (22*a*,22*b*) that face each other on each drying chamber (10).

The provision of two or more separate volumes also enables the flows of conditioned air to be regulated independently within each volume. In this way, it is possible to compensate any non-uniformities in the environmental conditions that could take place inside each drying channel (10). If, for example, at the outlet of the dryer it were to be noted that the products located inside a certain zone of a drying channel (10) had a different degree of moisture from the other products, or from other product zones, it is possible to intervene on the flows of conditioned air that feeds the considered zone to correct the difference in moisture.

For example, in a first solution, each volume (2A,2B,2C) can be connected to a respective source of conditioned air. For that purpose, each volume (2A, 2B, 2C) can be provided with a respective inlet conduit (20A, 20B, 20C) that is isolated from the others.

In a second possible solution, alternatively or in combination with such first solution, each inlet conduit (20A,20B, 20C) is provided with a flow rate regulator (5A,5B,5C). In this second solution, there may be one single source of conditioned air. To regulate the delivery of air into a drying channel (10) in a differentiated way, it is possible to regulate the flow rate of air supplied to each volume (2A,2B,2C) in a differentiated way, by means of flow rate regulators (5A,5B,5C). For example, if it were to be noted that, in a certain zone of a drying channel (10), the products have a higher degree of moisture with respect to other zones, it is possible to increase the flow rate of air through the flow rate regulator (5A,5B,5C) that supplies such zone.

In the illustrated embodiment, which is preferred but not exclusive, the flow rate regulators (5A,5B,5C) are in the form of butterfly valves, i.e. each of them comprises a slab rotatable about an axis of rotation transverse to the direction of the flow of air. Each slab is rotatable between a closing position, in which it is arranged transversally to its own inlet conduit (20A,20B,20C), closing the section thereof in order to prevent the flow of air, and an opening position, in which it is oriented on a plane substantially parallel to that of the flow of air, only minimally closing the section of its own inlet conduit (20A,20B,20C). Between the opening position and the closing position, each valve can be arranged in intermediate positions to regulate the section of its own inlet conduit (20A,20B,20C). In a known way to a person skilled in the art, the regulation of each valve can be performed manually or automatically.

Figure 3:
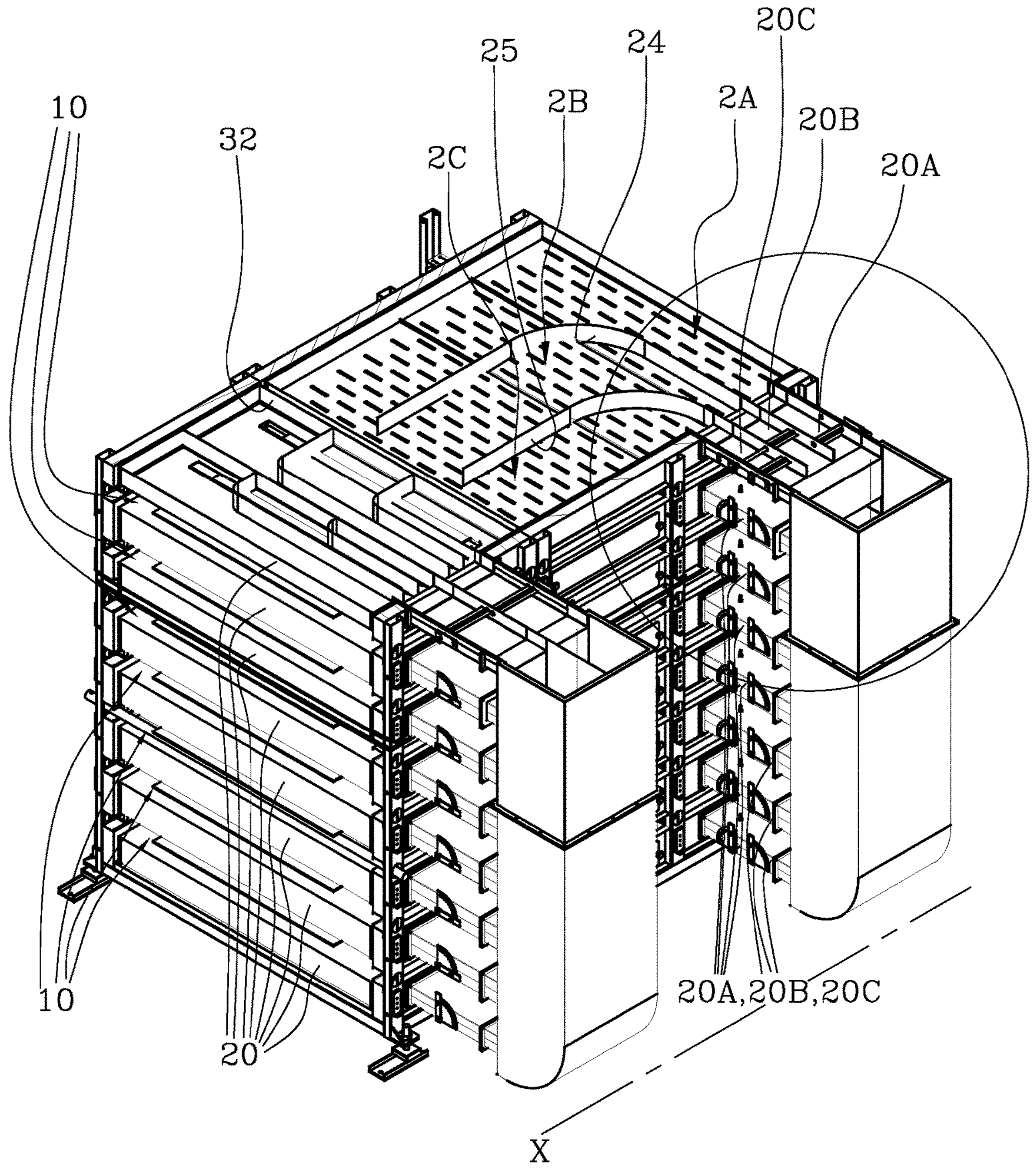
FIG. 3 shows the dryer of FIG. 2, with some parts removed.
Figure 4:
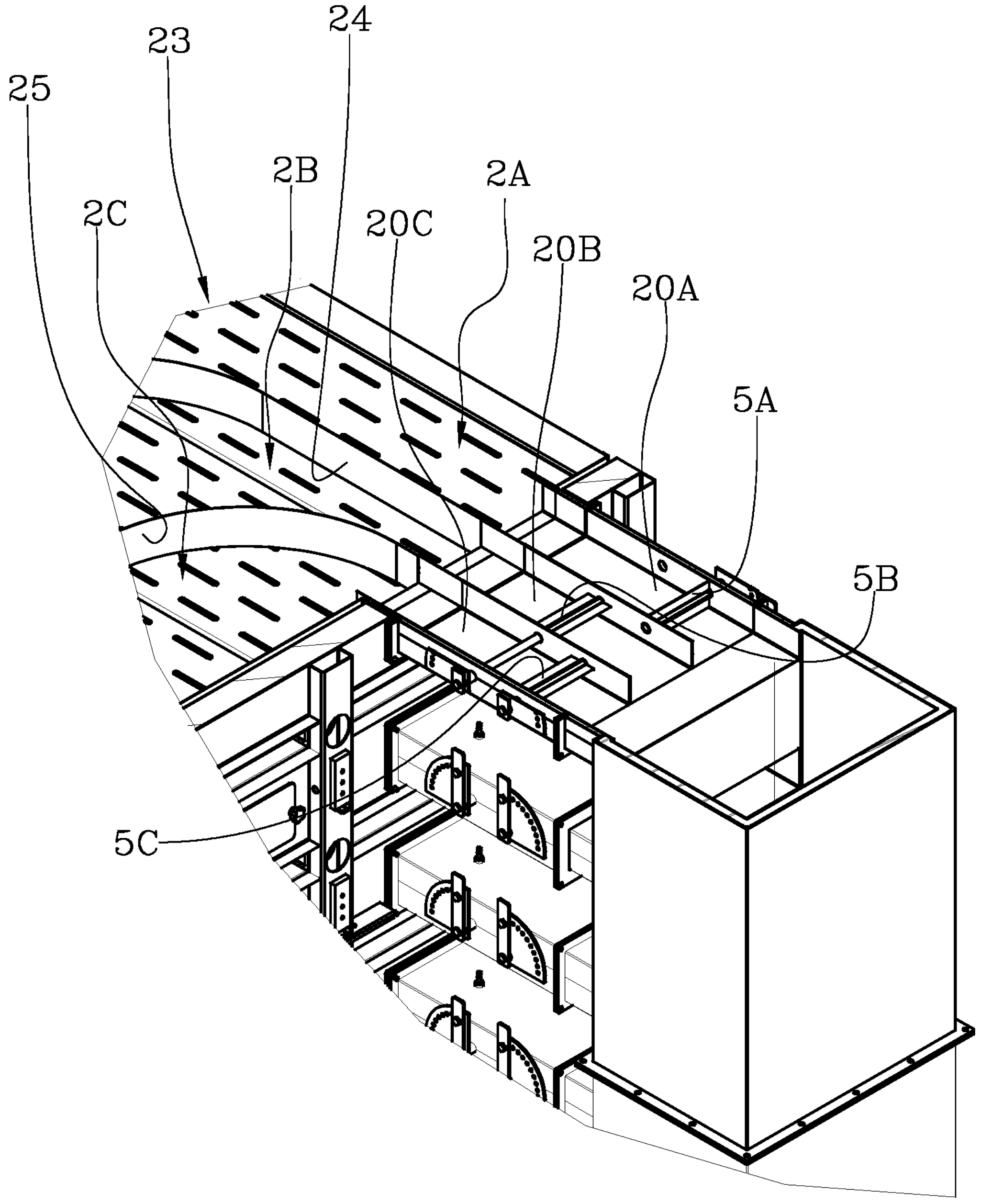
FIG. 4 shows a detail of FIG. 3 in an enlarged scale.
Figure 5:
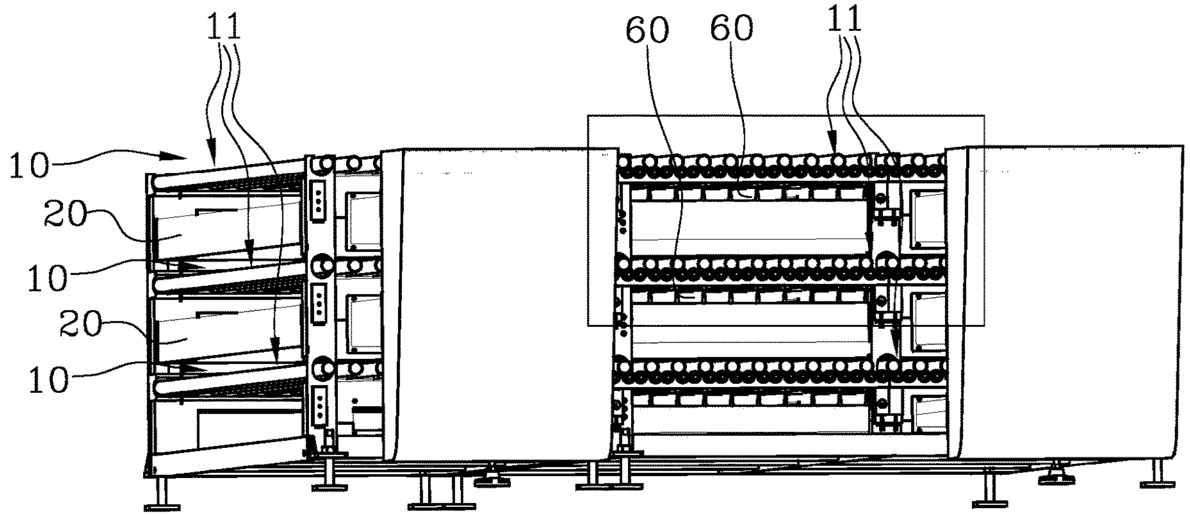
FIG. 5 is an isometric view of a portion of the dryer according to the present invention and in a second embodiment.
Figure 6:
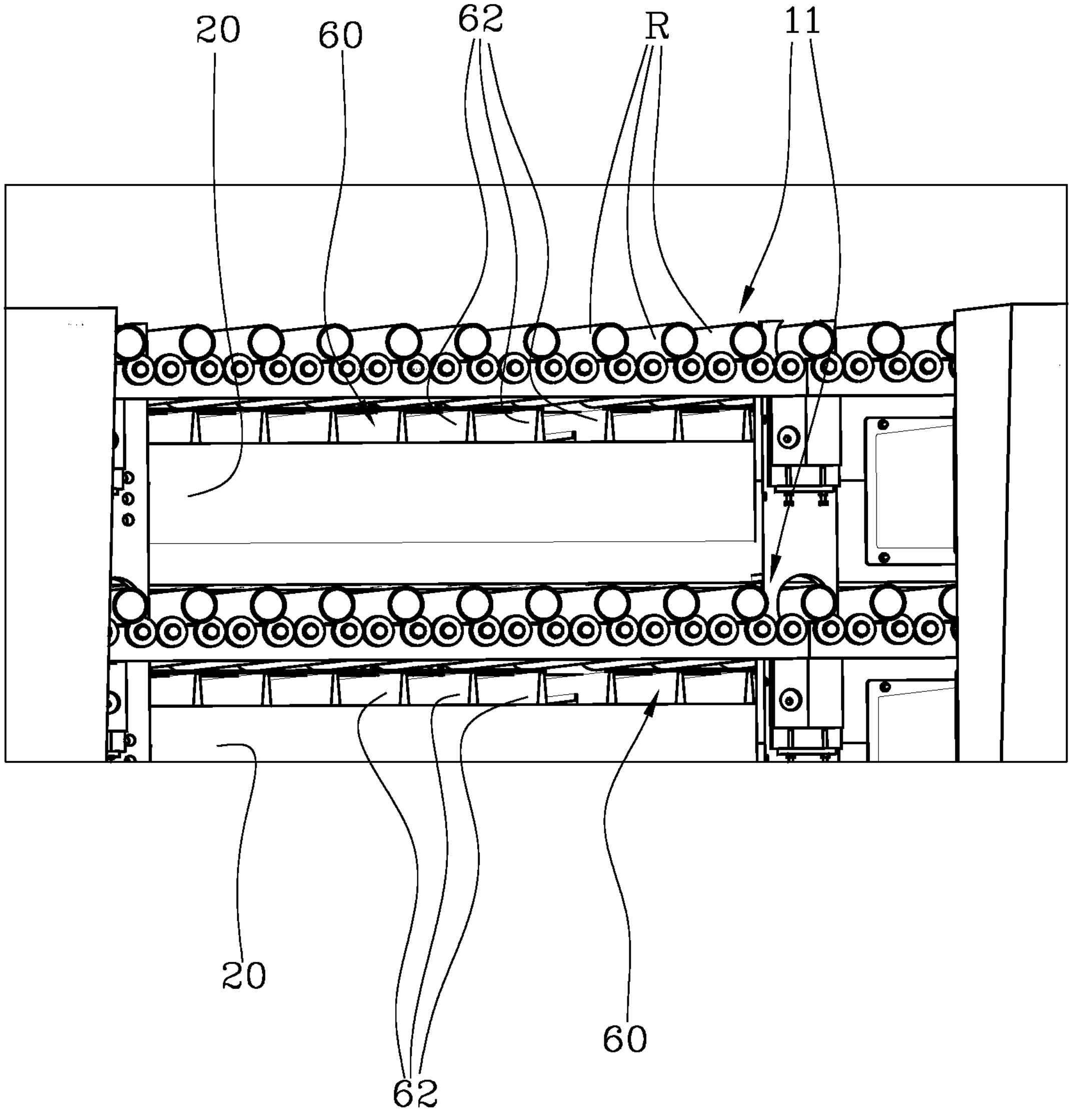
FIG. 6 shows a zone of the dryer of FIG. 5 in an enlarged scale.
Figure 7:
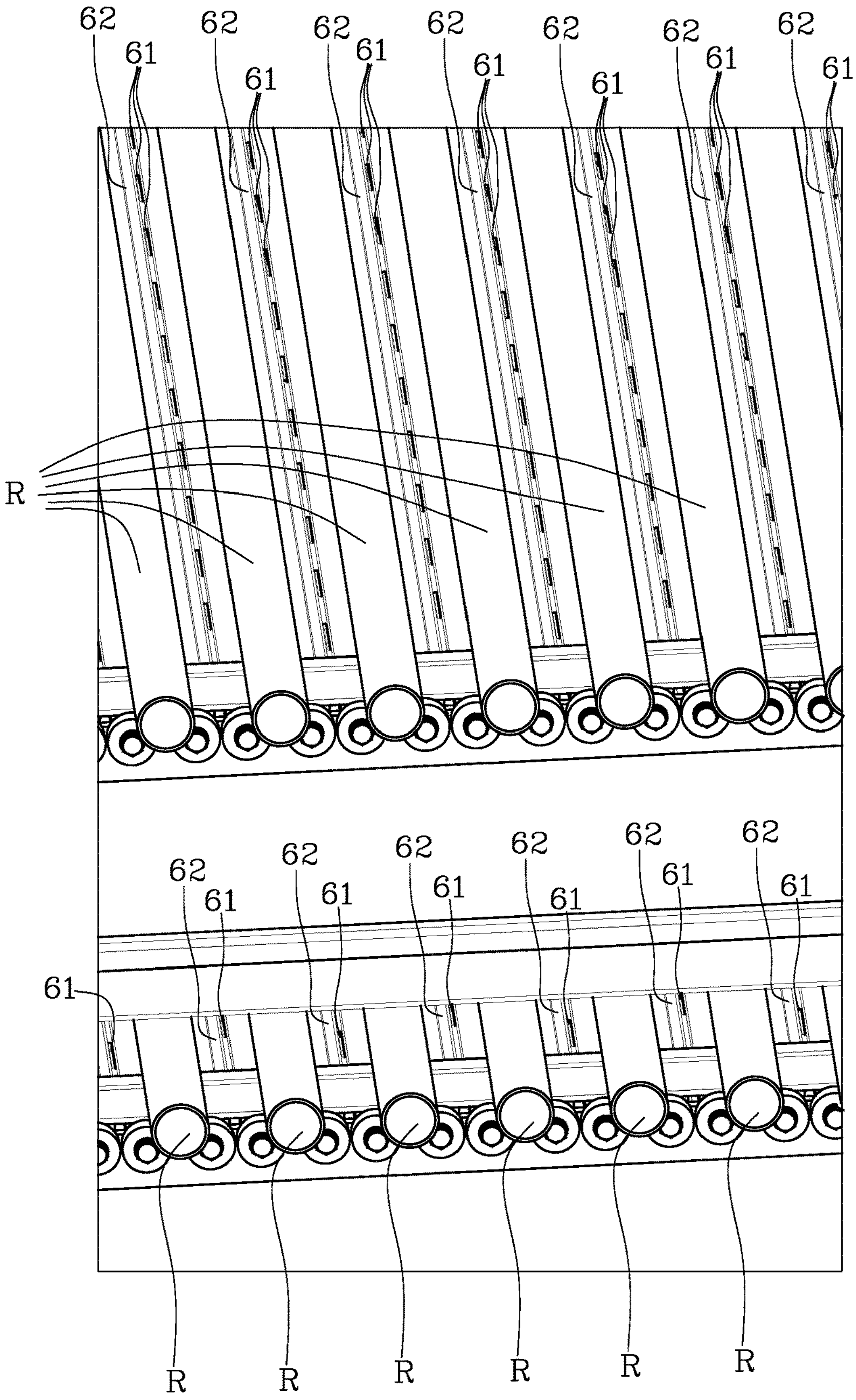
FIG. 7 shows the zone of FIG. 6 from a different angle.
Figure 8:
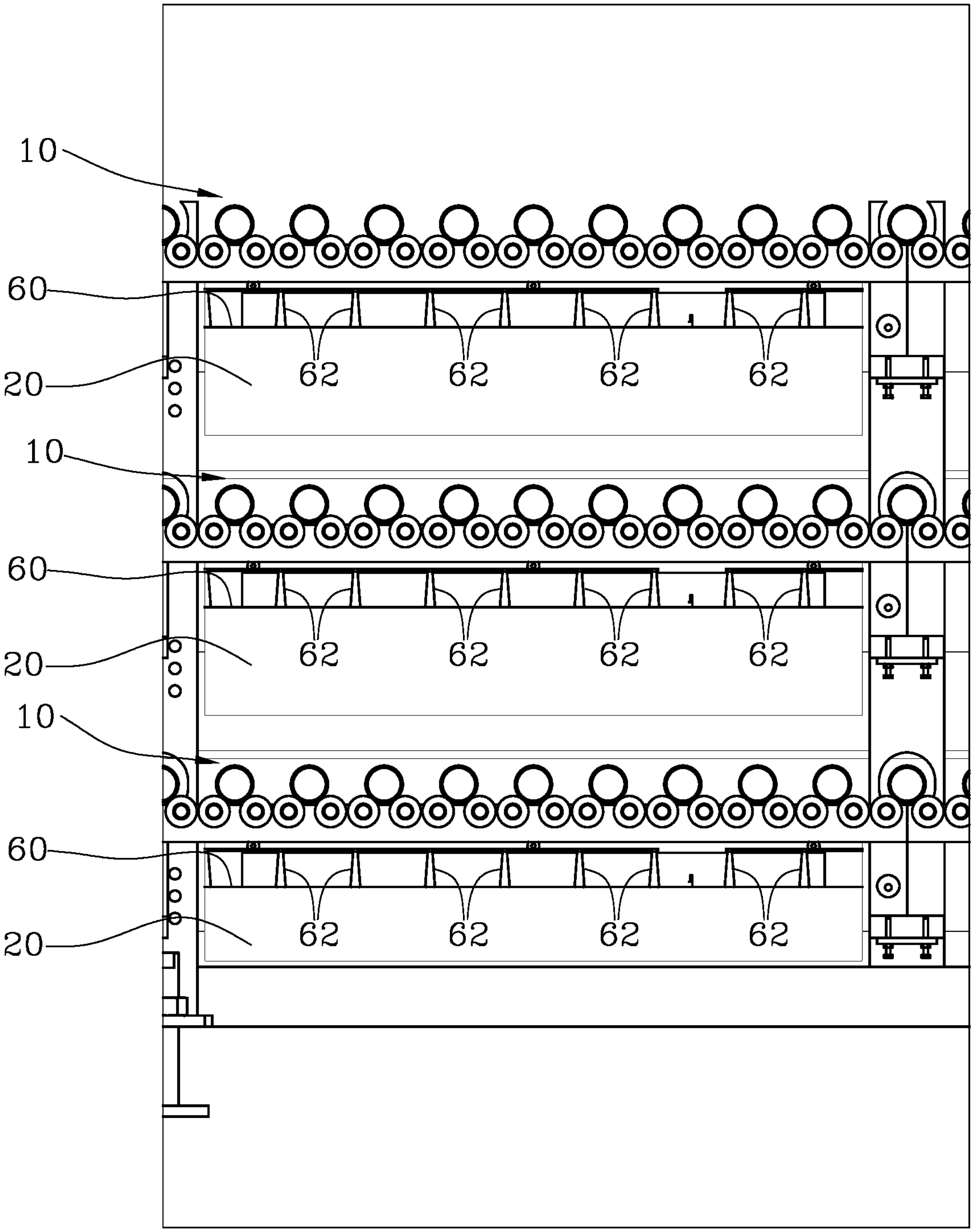
FIG. 8 shows a vertical elevation view of an enlargement of FIG. 5.

Preferably, but not necessarily, the drying chamber (1) is connected to an air extraction circuit. Such circuit, known to a person skilled in the art, envisages one or more suction hoods (30), located inside the drying chamber (1), through which the air can be totally or partially evacuated towards the outside or can be totally or partially re-introduced into the dryer itself. In the illustrated embodiment, there is a suction hood (30) for each shelf (11). Preferably, each hood (30) is arranged substantially coplanar to the manifold (20) superimposed with the shelf (11) itself. It is possible, for example, to afford the hood (30) inside the same box-shaped body that defines the manifold (20). As shown in FIG. 3, it is possible to separate the suction hood (30) from the manifold (20) through a transverse wall (32). The use of an air extraction circuit enables the homogeneity and uniformity of the environmental characteristics inside the drying chamber (1) to be increased further.

The invention claimed is:

1. A dryer for ceramic products, such as for example slabs or tiles, comprising:
- a drying chamber (1);
- at least one drying channel (10), comprising a shelf (11) for one or more ceramic products;
- at least two manifolds (20), positioned respectively above and below the shelf (11), each of which is connected to a source of conditioned air; and
- a collection drawer (60) located above the manifold (20) arranged below the shelf (11);
- wherein the manifold (20) located above the shelf (11) has an extended shape and is provided with a flat lower surface (21*a*), which in the plan view covers at least a portion of the shelf (11) and is provided with a plurality of lower openings (22*a*) for emitting the conditioned air inside the drying channel (10);
- wherein the manifold (20) located below the shelf (11) has an extended shape and is provided with a flat upper surface (21*b*), which in the plan view covers at least a portion of the shelf (11) and is provided with a plurality of upper openings (22*b*) for emitting the conditioned air inside the drying channel (10);
- wherein the lower surface (21*a*) has an extension that is substantially identical to that of the underlying shelf (11);
- wherein the upper surface (21*b*) has an extension that is substantially identical to that of the overlying shelf (11).

2. The dryer according to claim 1, wherein the lower openings (22*a*) are distributed substantially on the entire lower surface (21*a*).

3. The dryer according to claim 1, wherein the upper openings (22*b*) are distributed substantially on the entire upper surface (21*b*).

4. The dryer according to claim 1, wherein each manifold (20) has a flattened box shape, defined below by the lower surface (21*a*) and above by the flat upper surface (21*b*).

5. The dryer according to claim 1, wherein the manifold (20) comprises a casing (23) having a prismatic shape, which has a lower height (h) than two orthogonal dimensions of the lower surface (21*a*).

6. The dryer according to claim 1, wherein the lower surface (21*a*) is parallel to the underlying shelf (11).

7. The dryer according to claim 1, wherein the upper surface (21*b*) is parallel to the overlying shelf (11).

8. The dryer according to claim 1, wherein the manifold (20) comprises two or more volumes (2A,2B,2C), separated by one or more partitions (24,25) which isolate the volumes (2A,2B,2C) from one another.

9. The dryer according to claim 8, wherein each volume (2A,2B,2C) is connected to a respective source of conditioned air.

10. The dryer according to claim 8, wherein each volume (2A,2B,2C) is provided with a respective inlet conduit (20A,20B,20C) that is isolated from the others.

11. The dryer according to claim 10, wherein each inlet conduit (20A,20B,20C) is provided with a flow rate regulator (5A,5B,5C).

12. The dryer according to claim 1, comprising a plurality of drying channels (10) mutually parallel and superimposed, wherein two adjacent drying channels (10) are separated by a manifold (20) which is provided with lower openings (22*a*) on the lower surface (21*a*) and with upper openings (22*b*) on the upper surface (21*b*), to send the conditioned air towards an underlying shelf (11) and towards an overlying shelf (11).

13. The dryer according to claim 1, wherein the collection drawer (60) is provided with through openings (61), configured to enable the flow of air coming from the underlying manifold (20).

14. The dryer according to claim 1, wherein the collection drawer (60) can be extracted.

15. The dryer according to claim 13, comprising a plurality of projecting ribs (62), which extend towards the overlying shelf (11) and that are open towards the underlying manifold (20), wherein the through openings (61) are arranged in peak zones of the ribs (62).

* * * * *